United States Patent
Hillman

(10) Patent No.: US 10,081,331 B2
(45) Date of Patent: Sep. 25, 2018

(54) FASTENING ARRANGEMENT FOR A SAFETY BELT OF A REAR SEAT ROW OF A MOTOR VEHICLE AND MOTOR VEHICLE WITH SUCH A FASTENING ARRANGEMENT

(71) Applicant: GM GLOBAL TECHNOLOGY OPERATIONS LLC, Detroit, MI (US)

(72) Inventor: Klaas Hillman, Ruesselsheim (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 43 days.

(21) Appl. No.: 15/278,618

(22) Filed: Sep. 28, 2016

(65) Prior Publication Data

US 2017/0088094 A1   Mar. 30, 2017

(30) Foreign Application Priority Data

Sep. 28, 2015 (DE) .................. 10 2015 012 447

(51) Int. Cl.
*B60R 22/34* (2006.01)
*B60R 22/18* (2006.01)
(Continued)

(52) U.S. Cl.
CPC .......... *B60R 22/34* (2013.01); *B60R 11/0217* (2013.01); *B60R 22/18* (2013.01);
(Continued)

(58) Field of Classification Search
CPC ...... B60R 2022/266; B60R 2022/3402; B60R 2011/0024; B60R 2011/0036;
(Continued)

(56) References Cited

U.S. PATENT DOCUMENTS 4,971,357 A * 11/1990 Nakasaki ................ B60R 22/22
280/801.1
4,988,121 A *  1/1991 Yoshii .................... B60R 22/18
280/808

(Continued)

FOREIGN PATENT DOCUMENTS

CN         202029806 U      11/2011
CN         204020800 U      12/2014
(Continued)

OTHER PUBLICATIONS

Tony Johnson, Rear Shelf Speaker Aperture Modification, Information Sheet, Low Volume Vehicle Technical Association Inc., Nov. 2005, #11-2005, pp. 1-8.

(Continued)

*Primary Examiner* — Laura Freedman

(74) *Attorney, Agent, or Firm* — Lorenz & Kopf, LLP

(57) ABSTRACT

A fastening arrangement is disclosed for a safety belt of a rear seat row of a motor vehicle with a cross brace, which extends in the lateral direction. The fastening arrangement includes a tubular cross brace. The cross brace is provided with a mounting flange, on which a belt retractor is fastened and supported. The mounting flange is downwardly offset relative to an upper wall of the cross brace in the vertical direction.

20 Claims, 3 Drawing Sheets

(51) Int. Cl.
  *B60R 11/02* (2006.01)
  *B62D 25/08* (2006.01)
  *B60R 22/26* (2006.01)
  *B60R 11/00* (2006.01)

(52) U.S. Cl.
  CPC .... *B62D 25/087* (2013.01); *B60R 2011/0024* (2013.01); *B60R 2022/266* (2013.01); *B60R 2022/3402* (2013.01)

(58) Field of Classification Search
  CPC ..... B60R 11/0217; B60R 22/18; B60R 22/34; B62D 25/087
  See application file for complete search history.

(56) References Cited

U.S. PATENT DOCUMENTS

| | | | |
|---|---|---|---|
| 5,921,605 A | | 7/1999 | Musukula et al. |
| 6,983,971 B2* | | 1/2006 | Broadhead .............. B60R 5/044 |
| | | | 296/193.04 |
| 7,481,322 B2* | | 1/2009 | Heim ...................... B60R 5/044 |
| | | | 211/30 |
| 7,631,918 B2* | | 12/2009 | Yasukouchi ....... B62D 25/2027 |
| | | | 296/30 |
| 8,511,731 B2* | | 8/2013 | Sakai .................. B62D 25/087 |
| | | | 296/193.02 |
| 8,651,525 B2* | | 2/2014 | Kaku ..................... B60R 22/34 |
| | | | 280/756 |
| 9,701,250 B1* | | 7/2017 | Ranga ................. B60R 11/0223 |
| 9,718,413 B2* | | 8/2017 | Kato ................... B60R 11/0217 |
| 9,840,202 B1* | | 12/2017 | Ranga ................. B60R 11/0223 |

FOREIGN PATENT DOCUMENTS

| | | | | |
|---|---|---|---|---|
| DE | 10200104 | A1 | 7/2003 | |
| FR | 2975353 | A1 | 11/2012 | |
| GB | 2293313 | A | 3/1996 | |
| GB | 2301016 | A * | 11/1996 | .......... B60N 2/3013 |
| GB | 2379419 | A | 3/2003 | |
| JP | 02151548 | A * | 6/1990 | |
| JP | 06144155 | A * | 5/1994 | |
| JP | H08192721 | A | 7/1996 | |
| JP | 09156464 | A * | 6/1997 | |
| JP | 09254741 | A * | 9/1997 | |
| JP | H09295555 | A | 11/1997 | |
| JP | 2718300 | B2 | 2/1998 | |
| JP | 10129416 | A * | 5/1998 | |
| JP | 11152011 | A * | 6/1999 | |
| JP | 11170973 | A * | 6/1999 | |
| JP | H11198755 | A | 7/1999 | |
| JP | 11235968 | A * | 8/1999 | |
| JP | 2000108845 | A * | 4/2000 | |
| JP | 2000177641 | A | 6/2000 | |
| JP | 2000272471 | A * | 10/2000 | |
| JP | 2001191898 | A * | 7/2001 | |
| JP | 2005170228 | A * | 6/2005 | |
| JP | 2015107762 | A * | 6/2015 | |

OTHER PUBLICATIONS

Kerry Chesbro, Seat Belts, http://www.parrotbyte.com/kbc/ferrari/seat_belts.htm.
Seat Belt Systems Removal & Installation, Repair Guide, AutoZone, http://www.autozone.com/repairguides/Chrysler-Concorde-Intrepid-LHS-New-Yorker-Vision-1993-1997/INTERIOR/Seat-Belt-Systems/_/P-0900c1528006b2b2.

* cited by examiner

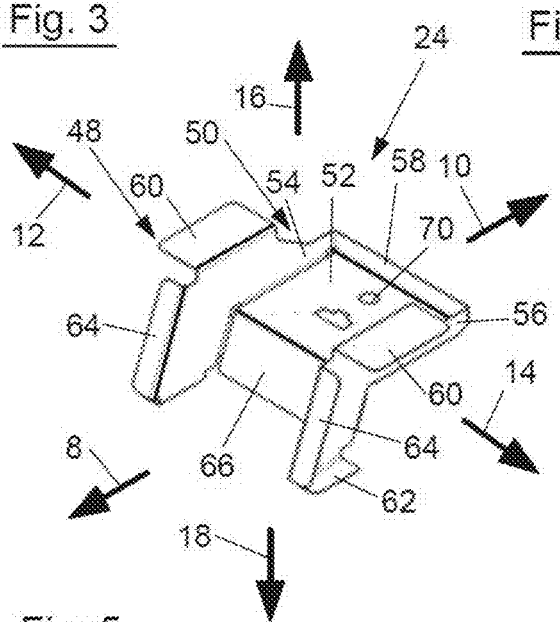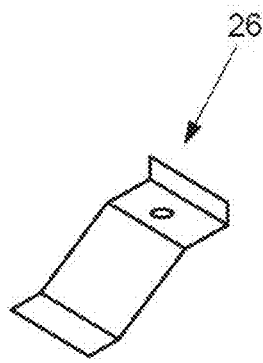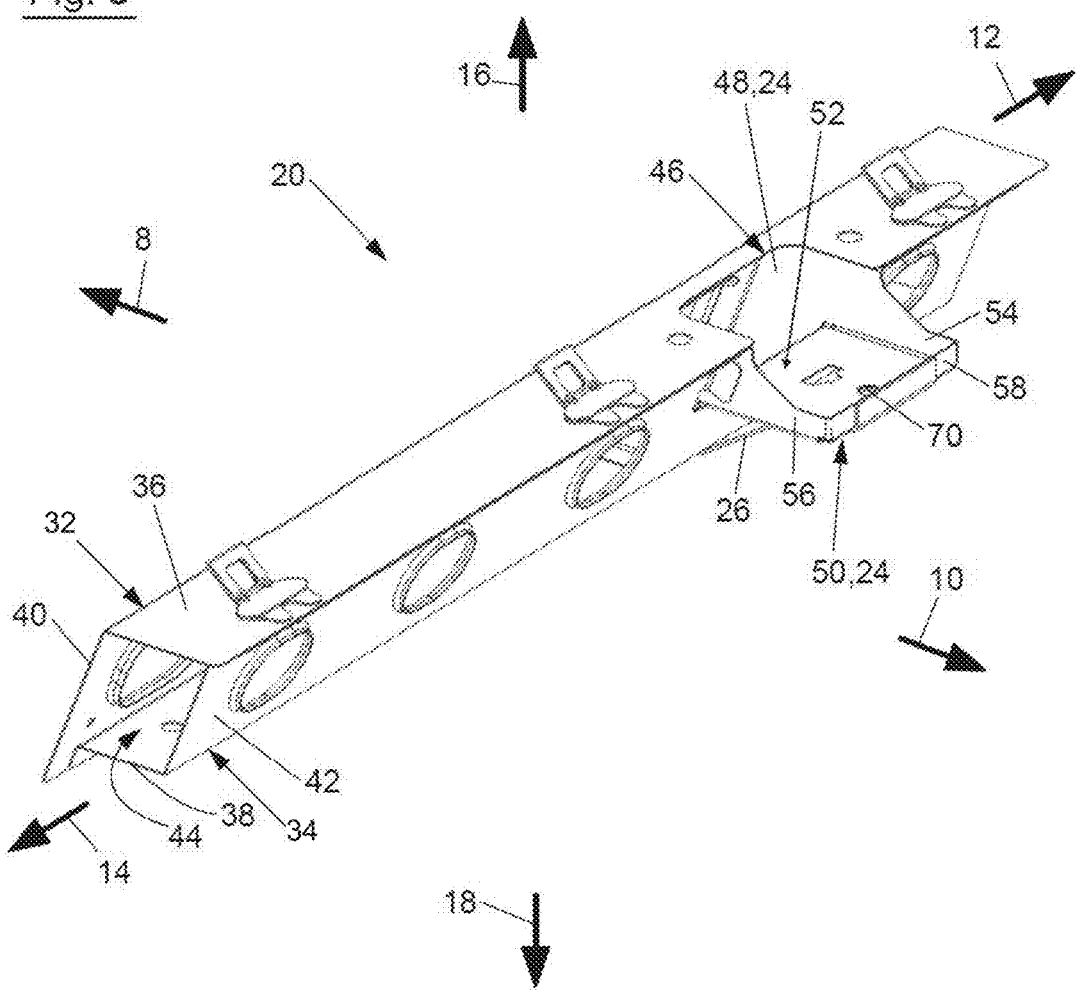

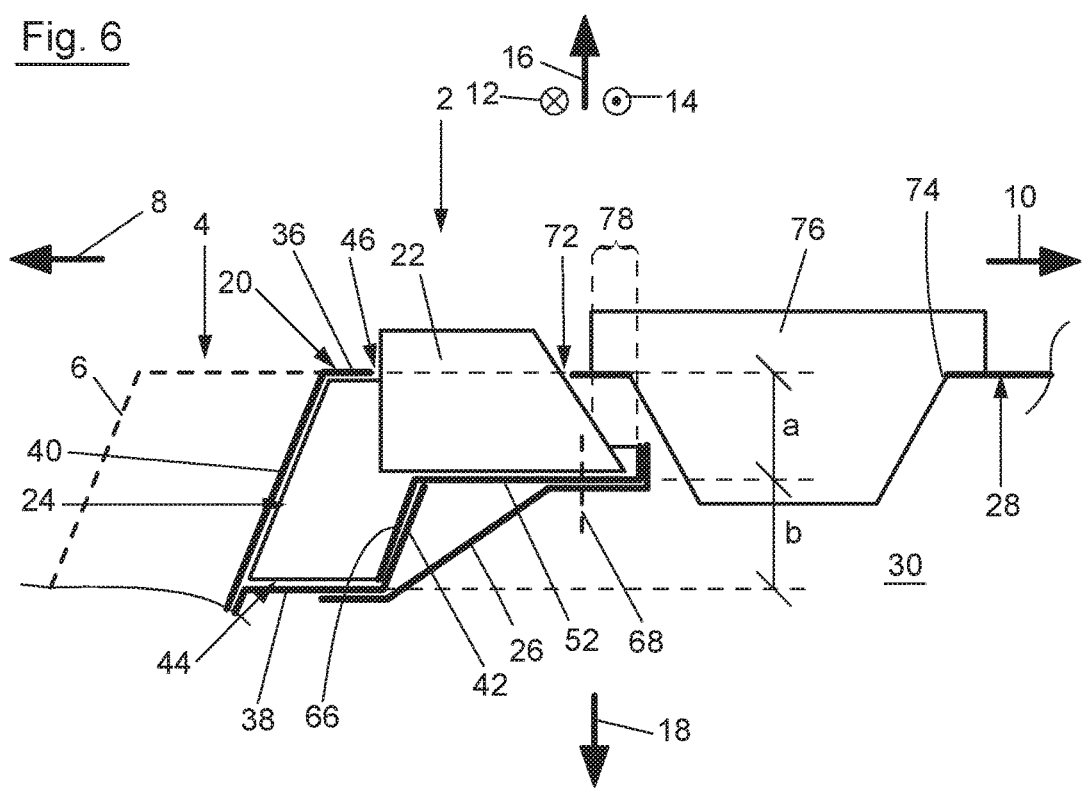

FASTENING ARRANGEMENT FOR A SAFETY BELT OF A REAR SEAT ROW OF A MOTOR VEHICLE AND MOTOR VEHICLE WITH SUCH A FASTENING ARRANGEMENT

CROSS-REFERENCE TO RELATED APPLICATION

This application claims priority to German Patent Application No. 102015012447.1, filed Sep. 28, 2015, which is incorporated herein by reference in its entirety.

TECHNICAL FIELD

The present disclosure pertains to fastening arrangements for a safety belt of a rear seat row of a motor vehicle, as well as motor vehicles with such a fastening arrangement.

BACKGROUND

Motor vehicles with a rear seat row, in which a cargo space is arranged behind the backrests of the rear seat row referred to the longitudinal direction, are generally known. The cargo space is forwardly defined in the longitudinal direction by the backrests of the rear seat row and upwardly defined in the vertical direction by a cover such as a rear-window shelf. In order to securely support the backrests of the rear seat row, the body of the motor vehicle features a cross brace that extends in the lateral direction and on which an upper section of the backrests of the rear seat row can be supported.

A safety belt, which can be rolled up by a belt retractor, is furthermore assigned to the rear seat row, particularly to the central seat of the rear seat row. The belt retractor may be fastened on a tubular cross brace or on the cover defining the top of the cargo space. A few disadvantages have been associated with conventional fastening arrangements for the safety belt. For example, a belt retractor that is fastened on top of the cross brace can restrict the view of the driver toward the rear. This applies particularly to a belt retractor that is fastened on top of the cover. If the belt retractor is fastened on the cover, the cover furthermore has to be reinforced with additional measures in order to ensure that the safety belt and therefore the belt retractor can also be sturdily held in its position on the cover if it is subjected to high tensile forces. In this case, the fastening arrangement also requires significant structural space and therefore can interfere with the potential installation of other components such as loudspeakers in the cover. In conventional fastening arrangements, the belt retractor frequently also reduces the size of the cargo space and represents an obstacle in so-called through-loading, in which cargo extends from the cargo space into the vehicle interior over the folded-down backrests of the rear seat row.

SUMMARY

The present disclosure provides a fastening arrangement for a safety belt of a rear seat row of a motor vehicle, which eliminates the above-described disadvantages and has a relatively simple and lightweight design. The present disclosure furthermore aims to develop a motor vehicle with such an advantageous fastening arrangement.

An embodiment of the present disclosure provides a fastening arrangement for a safety belt of a rear seat row of a motor vehicle, particularly for a safety belt of a central seat of the rear seat row of the motor vehicle. The fastening arrangement has a lateral direction, in which a cross brace extends. In the installed state of the fastening arrangement, the lateral direction of the fastening arrangement corresponds to the lateral direction of the motor vehicle. The cross brace is realized in a tubular fashion and features an interior extending in the lateral direction. The cross brace also features an upper wall, which upwardly defines the interior in the vertical direction.

The fastening arrangement furthermore features a belt retractor for the safety belt. This belt retractor could also be referred to as a belt roll-up device. The belt retractor is preferably realized in such a way that it automatically rolls up the safety belt as long as the safety belt is not pulled out of the belt retractor by force.

A mounting flange is provided on the cross brace, which is preferably made of metal or sheet metal, in this case, the mounting flange and the cross brace are preferably not realized in one piece, but the mounting flange rather is initially produced separately of the cross brace and subsequently fastened thereon. The belt retractor is fastened and supported on the mounting flange. The mounting flange is downwardly offset relative to the upper wall of the cross brace in the vertical direction. Due to the fact that the belt retractor is not arranged or fastened on a cover, but rather on the cross brace by the mounting flange, the arrangement of other components in a cover for the cargo space can be realized with greater flexibility. Since the mounting flange furthermore is downwardly offset relative to the upper wall of the cross brace in the vertical direction, it is ensured that the belt retractor does not upwardly protrude over the cross brace and a cover in the vertical direction to such a degree that it negatively affects or restricts the view of the driver. In addition, through-loading above and, if applicable, underneath the cross brace can thereby be realized in a relatively interference-free fashion.

Due to the arrangement of the belt retractor on the cross brace by the mounting flange, the belt retractor is also fastened in a particularly secure fashion such that elaborate reinforcing measures of the type required for the mounting on a cover can be eliminated. Furthermore, the fastener(s) required to fastening the belt retractor on the mounting flange, which preferably consist of one or more screws or threaded fasteners, can be downwardly offset relative to the upper wall of the cross brace in the vertical direction such that they do not protrude in an interfering fashion.

In an advantageous embodiment of the fastening arrangement, the mounting flange is downwardly spaced apart from the upper wall of the cross brace in the vertical direction in order to further enhance the above-described advantages.

According to another advantageous embodiment of the fastening arrangement, the mounting flange is aligned parallel to the upper wall of the cross brace. It is furthermore preferred that the mounting flange extends in a plane defined by the lateral directions and longitudinal directions of the fastening arrangement.

In another preferred embodiment of the fastening arrangement, the cross brace features a lower wall, which downwardly defines the interior within the cross brace in the vertical direction. The mounting flange is upwardly offset relative to the lower wall of the cross brace in the vertical direction and/or upwardly spaced apart from the lower wall in the vertical direction. This has the advantage that the belt retractor and, if applicable, the fasteners required for fastening the belt retractor on the mounting flange do not downwardly protrude over the cross brace in the vertical direction such that they could contribute to a reduction of the cargo space on the one hand and to an obstruction during the through-loading of cargo underneath the cross brace on the other hand.

In another advantageous embodiment of the fastening arrangement, the mounting flange rearwardly protrudes over the cross brace in the longitudinal direction such that the belt retractor can be advantageously arranged on the side of the cross brace facing away from the rear seat row.

In order to achieve a particularly high stability of the belt retractor and therefore of the fastening arrangement under loads with a simple and space-saving design thereof, the fastening arrangement furthermore features a tension brace. One side of the tension brace is fastened on the mounting flange and its other side is fastened on the cross brace. It was determined that tensile forces acting upon the safety belt and therefore upon the belt retractor and the mounting flange can thereby be very securely absorbed. In this embodiment, it proved advantageous with respect to the manufacture if one side of the tension brace is fastened on an underside of the mounting flange, which points vertically downward, and its other side is fastened on the lower wall of the cross brace.

In order to develop a simple and space-saving tension brace, which is furthermore well suited for absorbing tensile forces acting upon the mounting flange via the belt retractor, the tension brace is realized in a strip-like fashion or in the form of a sheet metal strip in another preferred embodiment of the fastening arrangement.

In order to achieve a particularly simple and compact design of the fastening arrangement, the tension brace is in another preferred embodiment of the fastening arrangement fastened on the mounting flange with the same fasteners, which are also used for fastening the belt retractor on the mounting flange. Consequently, only one fastener is ideally required for fastening the belt retractor and the tension brace on the mounting flange. In this respect, it proved advantageous—as already indicated above—to use a screw or threaded fastener for fastening the tension brace and the belt retractor on the mounting flange.

In order to arrange the belt retractor in a particularly space-saving fashion without excessively restricting the structural space, which is located behind the cross brace referred to the longitudinal direction and can be used for the arrangement of a cargo space cover, an opening is provided in the wall of the tubular cross brace in a particularly advantageous embodiment of the fastening arrangement. The belt retractor and/or the safety belt rolled up on the belt retractor at least partially protrudes into an interior of the cross brace through the opening.

In order to substantially diminish the weakening of the tubular cross brace caused by the arrangement of the above-described opening in its wall, this opening extends in another advantageous embodiment of the fastening arrangement over the upper wall and a wall of the tubular cross brace, which points rearward in the longitudinal direction. It is particularly preferred that the opening extends exclusively over the upper wall and the rearwardly pointing wall of the tubular cross brace.

As indicated above, the fastening arrangement features in another advantageous embodiment a plate-shape cover, which is arranged rearwardly adjacent to the cross brace referred to the longitudinal direction, in order to cover a cargo space located vertically underneath the cover. In this case, it is preferred that the mounting flange is arranged vertically underneath the cover and/or downwardly spaced apart from the cover in the vertical direction in order to realize a space-saving arrangement of the belt retractor without restricting the design of the cover due to the available structural space. Regardless of the respective embodiment, the aforementioned cover is preferably fastened on the cross brace, particularly on the upper wall of the tubular cross brace. The cover may also be connected or welded to the body of the motor vehicle.

In another advantageous embodiment of the fastening arrangement, the cover features a recess, through which the belt retractor fastened on the mounting flange and/or the safety belt rolled up on the belt retractor extends. In this case, it is preferred if the recess consists of a cutout in an edge of the cover, which points forward in the longitudinal direction.

In another preferred embodiment of the fastening arrangement, the cover is provided with at least one opening, into which a loudspeaker is inserted. It was already indicated above that the designer therefore has greater flexibility with respect to the placement of the opening, as well as of the loudspeaker within the opening, due to the space-saving arrangement of the belt retractor on the mounting flange.

In another preferred embodiment of the fastening arrangement, a section of the loudspeaker, preferably a section of the loudspeaker located above the cover, is arranged flush with the mounting flange in the vertical direction. In this way, a particularly compact design is achieved because the loudspeaker is positioned very close to the belt retractor.

According to another particularly advantageous embodiment of the fastening arrangement, the mounting flange is integrated into a carrying part fastened on the cross brace. In this case, the carrying part preferably is initially produced separately of the cross brace and the carrying part is subsequently fastened on the cross brace or components thereof.

In another advantageous embodiment of the fastening arrangement, the carrying part features in addition to the mounting flange at least one boundary wall, which protrudes upward in the vertical direction. This boundary wall is arranged on the periphery of the mounting flange and should make it possible to securely and sturdily arrange or fasten the belt retractor on the carrying part. In this respect, it proved advantageous if the carrying part features at least three boundary walls, namely two boundary walls that are arranged on the mounting flange opposite of one another referred to the lateral direction and one boundary wall that is arranged on the periphery of the mounting flange, which points rearward in the longitudinal direction. Accordingly, a carrying section of the carrying part, which has an essentially shell-shaped design, is thereby created in order to securely accommodate the belt retractor.

In another preferred embodiment of the fastening arrangement, the carrying part features a retaining section, which is accommodated in the interior of the tubular cross brace. The carrying part can thereby be very securely fastened on the cross brace. It is preferred to accommodate the retaining section in the interior of the tubular cross brace in a form-fitting fashion. In this case, the form fit is preferably realized in such a way that a pivoting motion of the mounting flange relative to the cross brace about a pivoting axis extending in the lateral direction is inhibited due to the form-fitting accommodation of the retaining section within the interior of the tubular cross brace. Accordingly, the carrying part in the present embodiment includes the retaining section and a carrying section. The carrying partition features the mounting flange and, if applicable, also the aforementioned boundary walls. The carrying part may extend from the retaining section in the interior of the tubular cross brace to the external carrying section through the opening in the wall of the tubular cross brace.

In another advantageous embodiment of the fastening arrangement, the retaining section of the carrying part features supporting studs, by which the retaining section is supported on the inner side of the wall of the cross brace. In this case, it is preferred that the retaining section is supported in a planar fashion by means of the supporting studs. It also proved advantageous if the retaining section is supported by the supporting studs on the inner side of the upper wall, as well as on the inner side of at least one of the other walls of the cross brace, preferably the wall pointing forward in the longitudinal direction and the lower wall pointing downward in the vertical direction and/or a wall pointing rearward in the longitudinal direction.

In order to simplify the insertion of the carrying part into the interior of the tubular cross brace and therefore the assembly of the fastening arrangement, as well as to ensure a particularly secure retention of the carrying part on the cross brace, the cross brace includes two shells that extend in the lateral direction, wherein the carrying part preferably is—as already mentioned above—realized separately of the shells. In the present embodiment, the two shells therefore can be assembled such that the retaining section of the carrying part is accommodated in the interior of the cross brace and the shells can subsequently be fastened on one another, for example, by rivets, screws, threaded fasteners or welding.

The retaining section of the carrying part may subsequently also be welded or otherwise rigidly connected to one or both shells. Alternatively, the retaining section of the carrying part can initially be fastened on one of the two shells before the shells are assembled. In this embodiment—as well as in the embodiments described above and below—it is preferred that the retaining section and the carrying section of the carrying part containing the mounting flange are realized in one piece, wherein the carrying part preferably consists of a sheet metal part. The two aforementioned shells of the cross brace preferably also include sheet metal parts.

Another embodiment of the present disclosure concerns a motor vehicle with a rear seat row having a fastening arrangement for a safety belt of the above-described type is arranged behind the seat row referred to the longitudinal direction. In a preferred embodiment of the motor vehicle, a cargo space of the above-described type is provided behind the backrests of the rear seat row. The backrests of the rear seat row preferably can be forwardly folded down in order to connect the cargo space to the vehicle interior and to allow through-loading. In another preferred embodiment of the motor vehicle, the aforementioned cargo space is upwardly defined in the vertical direction by the above-described cover.

BRIEF DESCRIPTION OF THE DRAWINGS

The present disclosure will hereinafter be described in conjunction with the following drawing figures, wherein like numerals denote like elements.

FIG. 3 shows a perspective representation of only the carrying part according to FIG. 1;

FIG. 4 shows a perspective representation of only the tension brace according to FIG. 1;

FIG. 5 shows a perspective representation of the cross brace according to FIG. 2, the carrying part according to FIG. 3 and the tension brace according to FIG. 4 in the assembled state; and FIG. 6 shows a schematic section along a plane of section defined by the vertical directions and longitudinal directions in the region of the belt retractor according to FIG. 1.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

Figure 1:
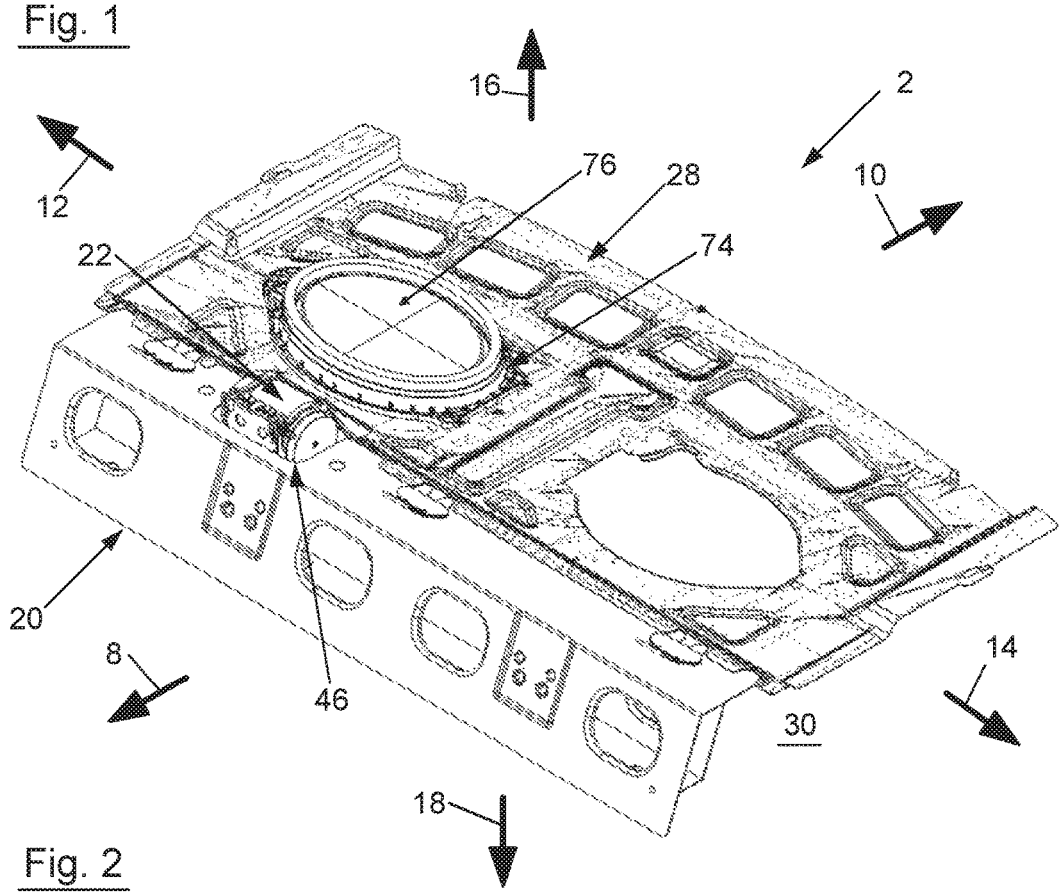
FIG. 1 shows a perspective representation of an embodiment of a fastening arrangement for a safety belt of a rear seat row of a motor vehicle'

FIG. 1 shows a perspective representation of an embodiment of the fastening arrangement 2 for a safety belt of a rear seat row 4 of a motor vehicle. The backrest 6 of the rear seat row 4 is indicated with broken lines in FIG. 6. In the respective figures, the opposite longitudinal directions 8, 10, the opposite lateral directions 12, 14 and the opposite vertical directions 16, 18 of the fastening arrangement 2 are indicated with corresponding arrows. The lateral directions 12, 14 and the vertical direction 16, 18 correspond to the lateral directions and vertical directions of the motor vehicle in the installed state of the fastening arrangement 2 within the motor vehicle whereas the longitudinal direction 8 corresponds to the forward direction of the motor vehicle and the longitudinal direction 10 corresponds to the rearward direction of the motor vehicle.

The fastening arrangement 2 includes a tubular cross brace 20, a belt retractor 22 for the safety belt assigned to the rear seat row 4, a carrying part 24 illustrated, in particular, in FIGS. 3 and 5, a tension brace 26 illustrated in FIGS. 4 and 5 and a plate-shaped cover 28 for covering a cargo space 30 arranged vertically underneath the cover 28, wherein the aforementioned components, as well as their interactions, are described in greater detail below.

Figure 2:
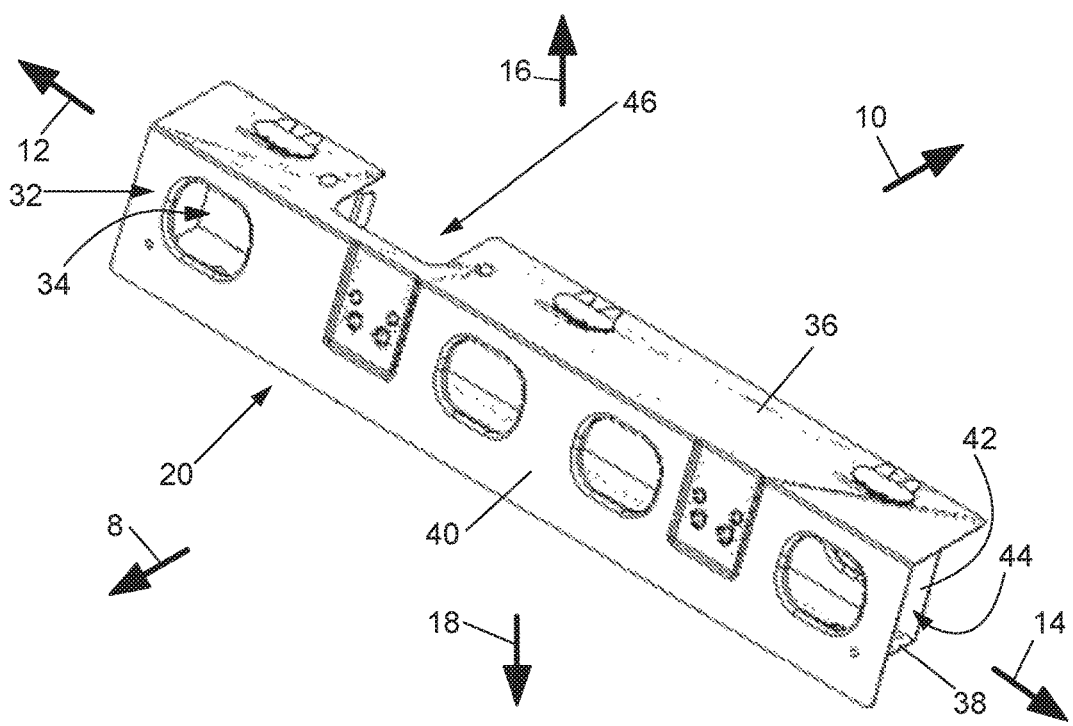
FIG. 2 shows a perspective representation of only the cross brace according to FIG. 1'

The cross brace 20 extends in the lateral directions 12, 14 and preferably is rigidly connected to the body of the motor vehicle or forms a component of the motor vehicle body in its installed state, wherein the cross brace 20 may for this purpose be welded to the body of the motor vehicle with its ends pointing in the lateral directions 12, 14. The cross brace 20 preferably is also realized in the form of a sheet metal part. FIGS. 2 and 5, in particular, show that the cross brace 20 includes two shells extending in the lateral directions 12, 14, namely a shell 32 and a shell 34. The cross brace features an upper wall 36, which points upward in the vertical direction 16, a lower wall 38, which points downward in the vertical direction 18, a front wall 40, which points forward in the longitudinal direction 8, and a rear wall 42, which points rearward in the longitudinal direction 10. The upper wall 36 and the front wall 40 are formed by the shell 32 whereas the lower wall 38 and the rear wall 42 are formed by the shell 34. The two shells 32, 34 are fastened on one another, for example, by welding in order to achieve a tubular design of the cross brace 20. Consequently, the aforementioned walls 36, 38, 40, 42 of the cross brace 20 define an interior 44 within the cross brace 20. An opening 46 is furthermore provided in the wall of the cross brace and continuously extends over the upper wall 36 and the rear wall 42. In the embodiment shown, the opening 46 is produced in a particularly simple fashion by means of a peripheral incision in the upper wall 36 and a peripheral incision in the rear wall 42.

The carrying part 24 illustrated, in particular, in FIGS. 3 and 5 is preferably realized in the form of a one-piece sheet metal part and can with respect to its function be divided into a retaining section 48 and a carrying section 50. According to FIG. 5, the carrying part 24 extends through the opening 46 in the wall of the cross brace 20 in such a way that the retaining section 48 is arranged in the interior 44 of the cross brace 20 whereas the carrying section 50 is arranged outside the interior 44. The carrying section 50 features a mounting flange 52, which is realized in a plate-shaped fashion and aligned parallel to the upper wall 36 of the cross brace 20. The mounting flange 52 furthermore is aligned parallel to the lower wall 38 of the cross brace 20. In this case, the carrying part 24 is inserted into the interior 44 of the cross brace 20 through the opening 46 in such a way that the carrying section 50 and therefore also the mounting flange 52 extends rearward from the cross brace 20 in the longitudinal direction 10 and consequently protrudes over the cross brace 20 in this direction.

In addition, the carrying section 50 features three boundary walls 54, 56, 58, which are peripherally arranged on the mounting flange 52 and protrude upward in the vertical direction 16, such that the carrying section 50 is at least partially realized in a shell-shaped fashion. In this case, the boundary walls 54, 56 are drawn forward in the longitudinal direction 8 such that they simultaneously form part of the retaining section 48. The retaining section 48 is accommodated in the interior 44 of the cross brace 20—in this case in a form-fitting fashion—such that the retaining section—and therefore also the entire carrying part 24—is reliably supported on the cross brace 20 in the directions 8-16. For this purpose, the retaining section 48 features upper supporting studs 60 for its planar support on the inner side of the upper wall 36, lower supporting studs 62 for its planar support on the inner side of the lower wall 38 and front supporting studs 64 for its planar support on the inner side of the front wall 40. The support on the inner side of the rear wall 42 is realized by means of a supporting section 66 that is angled relative to the mounting flange 52.

During the course of the manufacture, the carrying part 24 is initially produced separately of the aforementioned shells 32, 34 of the cross brace 20. The retaining section 48 is then positioned between the two shells 32, 34 before they are assembled into the tubular cross brace 20 such that the retaining section 48 is accommodated in the interior 44 whereas the carrying section 50 extends outward through the opening 46 in the above-described fashion. The two shells 32, 34 can then be fastened on one another. Consequently, the carrying part 24 is securely fastened on the cross brace 20 in a form-fitting fashion. The carrying part 24 may also be additionally fastened on the cross brace 20 or the two shells 32, 34 of the cross brace 20, for example by welding, but this is not absolutely imperative and therefore not illustrated in the drawings.

According to FIGS. 5 and 6, in particular, the mounting flange 52 of the carrying part 24 is downwardly offset relative to the upper wall 36 in the vertical direction 18 and forwardly offset relative to the lower wall 38 in the vertical direction 16 after the carrying part has been fastened on the cross brace 20. The mounting flange 52 is also downwardly spaced apart from the upper wall 36 in the vertical direction 18 as indicated with the distance a in FIG. 6. Furthermore, the mounting flange 52 is upwardly spaced apart from the lower wall 38 in the vertical direction 16 as indicated with the distance b in FIG. 6.

The belt retractor 22 is fastened and supported on the side of the mounting flange 52, which points upward in the vertical direction 16. In this case, the fastening of the belt retractor 22 is realized with a fastening means 68 in the form of a screw indicated with broken lines in FIG. 6. In this case, the screw 68 extends in the vertical direction 16, 18 from the underside to the upper side of the mounting flange 52 through an opening 70 provided in the mounting flange 52. It is preferred that the head of the screw is or can be directly or indirectly supported on the side of the mounting flange 52, which points downward in the vertical direction 18. FIGS. 1 and 6 furthermore show that the belt retractor 22 and/or the safety belt rolled up on the belt retractor 22 at least partially extends into the interior 44 of the cross brace 20 or protrudes into this interior 44 through the opening 46 in its fastened position on the mounting flange 52 such that the opening 46 and the interior 44 contribute to a space-saving arrangement of the belt retractor 22.

The aforementioned tension brace 26 is provided for fastening and supporting the belt retractor 22 on the mounting flange 52 in a particularly stable fashion. The tension brace 26 illustrated, in particular, in FIGS. 4, 5 and 6 is preferably realized in the form of a sheet metal part and/or in a strip-like fashion, particularly in the form of a sheet metal strip. The tension brace 26 is—according to FIG. 6—fastened on the underside of the mounting flange 52, which points downward in the vertical direction 18, on the one hand and on the cross brace 20, in this case on the lower wall 38 of the cross brace 20, on the other hand in order to reliably support and absorb the tensile forces exerted upon the belt retractor 22 and the mounting flange 52 via the safety belt. According to FIGS. 5 and 6, a central section of the tension brace 26 is neither fastened or supported on the carrying part 24 nor on the cross brace 20 such that this section can also be referred to as a freely extending central section. The fastening of the tension brace 26 on the mounting flange 52 one hand and on the cross brace 20 on the other hand may be realized with welded joints or fastener joints. In this respect, it is preferred that the tension brace 26 is fastened on the mounting flange 52 with the same fastener 68 or, in this case, with the same screw or threaded fastener, which is also used for fastening the belt retractor 22 on the mounting flange 52 in order to achieve a particularly simple, compact and lightweight design.

The aforementioned plate-shaped cover 28 extends in a plane defined by the longitudinal directions 8, 10 and the lateral directions 12, 14. The cover 28 may once again be realized in the form of a sheet metal part. For example, the cover 28 in the form of a sheet metal part may respectively be welded to the body of the motor vehicle or form part of the motor vehicle body. The cover 28 is fastened on the cross brace 20 such that it is positioned rearwardly adjacent to the cross brace 20 in the longitudinal direction 10. In this case, the cover 28 is positioned adjacent to the cross brace 20 in such a way that the mounting flange 52 is arranged underneath the cover 28 in the vertical direction 18 and downwardly spaced apart therefrom in the vertical direction 18 as illustrated, in particular, in FIG. 6.

The cover 28 features a recess 72, through which the belt retractor 22 and/or the safety belt rolled up on the belt retractor 22 extends. In the embodiment shown, the recess 72 is advantageously formed by an incision in an edge of the cover 28, which points forward in the longitudinal direction 8. Furthermore, the cover 28 is provided with at least one opening 74, into which a loudspeaker 76 is inserted. A front section 78 of the loudspeaker 76 referred to the longitudinal direction 8, in this case a section 78 of the loudspeaker 76 positioned above the cover 28 in the vertical direction 16, is arranged flush with the mounting flange 52 of the carrying part 24 in the vertical direction 16, 18 in order to achieve a particularly compact design.

It was already indicated above that the fastening arrangement 2 is arranged behind the rear seat row 4 referred to the longitudinal direction 10 as illustrated, in particular, in FIG. 6. The not-shown safety belt or the belt retractor 22 associated with the safety belt is assigned to a central seat of the rear seat row 4.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

The invention claimed is:

1. A fastening arrangement for a safety belt of a rear seat row of a motor vehicle, the fastening arrangement comprising:
   a cross brace configured to extend in a lateral direction of the motor vehicle, the cross brace having a tubular portion with an upper wall, and
   a mounting flange provided on the cross brace and configured to support and fasten a belt retractor thereon, wherein said mounting flange is downwardly offset relative to the upper wall of the cross brace in a vertical direction,
   wherein the mounting flange is integrated into a carrying part fastened on the cross brace, wherein the carrying part includes at least one boundary wall which is peripherally arranged on the mounting flange and protrudes upward in the vertical direction, and
   wherein the carrying part further comprises a retaining section accommodated in an interior of the cross brace in a form-fitting fashion, the retaining section supported on the inner side of the wall of the cross brace in a planar fashion by a supporting stud.

2. The fastening arrangement according to claim 1, wherein the mounting flange is aligned parallel to the upper wall.

3. The fastening arrangement according to claim 1, wherein the cross brace comprises a lower wall, wherein the mounting flange is upwardly offset relative to the lower wall in the vertical direction.

4. The fastening arrangement according to claim 1, wherein the mounting flange rearwardly protrudes over the cross brace in the longitudinal direction.

5. The fastening arrangement according to claim 1, further comprising a tension brace fastened on the mounting flange with a fastener configured to fasten the belt retractor on the mounting flange, wherein the tension brace comprises a sheet metal strip fastened on the mounting flange.

6. The fastening arrangement according to claim 1, wherein the cross brace has an opening formed in a wall of the cross brace, wherein the opening is configured to at least partially receive the belt retractor such that the safety belt rolled up on the belt retractor at least partially protrudes into an interior of the cross brace through the opening.

7. The fastening arrangement according to claim 1, further comprising a plate-shaped cover provided rearwardly adjacent to the cross brace in the longitudinal direction and configured to cover a cargo space arranged underneath the cover in the vertical direction, wherein the mounting flange is arranged underneath the cover in the vertical direction and downwardly spaced apart therefrom in the vertical direction.

8. The fastening arrangement according to claim 7, wherein the cover has a recess in an edge thereof that points forward in the longitudinal direction configured to at least partially receive at least a portion of the belt retractor.

9. The fastening arrangement according to claim 1, wherein the cross brace comprises two shells that extend in the lateral direction and the carrying part is realized separately of the two shells.

10. A motor vehicle comprises a rear seat row, a belt retractor and a fastening arrangement according to claim 1 arranged behind the rear seat row.

11. A fastening arrangement for a safety belt of a rear seat row of a motor vehicle, the fastening arrangement comprising:
   a cross brace configured to extend in a lateral direction of the motor vehicle, the cross brace having a tubular portion with an upper wall;
   a mounting flange provided on the cross brace and configured to support and fasten a belt retractor thereon, wherein said mounting flange is downwardly offset relative to the upper wall of the cross brace in a vertical direction; and
   a plate-shaped cover provided rearwardly adjacent to the cross brace in the longitudinal direction and configured to cover a cargo space arranged underneath the cover in the vertical direction, wherein the mounting flange is arranged underneath the cover in the vertical direction and downwardly spaced apart therefrom in the vertical direction,
   wherein the cover has an opening formed therein, wherein the opening is configured to insert a loudspeaker therein such that a section of the loudspeaker is positioned above the cover and flush with the mounting flange in the vertical direction.

12. The fastening arrangement according to claim 11, wherein the mounting flange is integrated into a carrying part fastened on the cross brace, wherein the carrying part includes at least one boundary wall which is peripherally arranged on the mounting flange and protrudes upward in the vertical direction.

13. The fastening arrangement according to claim 11, wherein the mounting flange is aligned parallel to the upper wall.

14. The fastening arrangement according to claim 11, wherein the cross brace comprises a lower wall, wherein the mounting flange is upwardly offset relative to the lower wall in the vertical direction.

15. The fastening arrangement according to claim 11, wherein the mounting flange rearwardly protrudes over the cross brace in the longitudinal direction.

16. The fastening arrangement according to claim 11, further comprising a tension brace fastened on the mounting flange with a fastener configured to fasten the belt retractor on the mounting flange, wherein the tension brace comprises a sheet metal strip fastened on the mounting flange.

17. The fastening arrangement according to claim 11, wherein the cross brace has an opening formed in a wall of the cross brace, wherein the opening is configured to at least partially receive the belt retractor such that the safety belt rolled up on the belt retractor at least partially protrudes into an interior of the cross brace through the opening.

18. The fastening arrangement according to claim 11, further comprising a plate-shaped cover provided rearwardly adjacent to the cross brace in the longitudinal direction and configured to cover a cargo space arranged underneath the cover in the vertical direction, wherein the mounting flange is arranged underneath the cover in the vertical direction and downwardly spaced apart therefrom in the vertical direction.

19. The fastening arrangement according to claim 18, wherein the cover has a recess in an edge thereof that points forward in the longitudinal direction configured to at least partially receive at least a portion of the belt retractor.

20. A motor vehicle comprises a rear seat row, a belt retractor and a fastening arrangement according to claim 11 arranged behind the rear seat row.

\* \* \* \* \*